(12) United States Patent
Kohashi et al.

(10) Patent No.: US 7,456,873 B2
(45) Date of Patent: Nov. 25, 2008

(54) IMAGE SIGNAL PROCESSING SYSTEM AND CAMERA FOR OBTAINING LUMINANCE-SYSTEM SIGNAL AND COLOR-SYSTEM SIGNAL

(75) Inventors: Atsushi Kohashi, Akiruno (JP); Keiichi Mori, Hachioji (JP)

(73) Assignee: Olympus Corporation, Tokyo (JP)

( * ) Notice: Subject to any disclaimer, the term of this patent is extended or adjusted under 35 U.S.C. 154(b) by 896 days.

(21) Appl. No.: 10/405,913

(22) Filed: Apr. 2, 2003

(65) Prior Publication Data

US 2004/0091145 A1    May 13, 2004

(30) Foreign Application Priority Data

Apr. 11, 2002    (JP) .............................. 2002-109660

(51) Int. Cl.
- *H04N 9/68* (2006.01)
- *H04N 5/202* (2006.01)
- *H04N 9/69* (2006.01)
- *G03F 3/08* (2006.01)

(52) U.S. Cl. ....................... 348/235; 348/254; 348/675; 348/676; 358/519

(58) Field of Classification Search ................. 348/234, 348/235, 237, 241, 254, 255, 671, 674, 675, 348/676; 358/519
See application file for complete search history.

(56) References Cited

U.S. PATENT DOCUMENTS

| | | | | |
|---|---|---|---|---|
| 5,194,943 A * | 3/1993 | Tomita et al. | ................ | 348/255 |
| 5,267,028 A * | 11/1993 | Suga et al. | ................... | 348/237 |
| 5,337,152 A * | 8/1994 | Kotaki | ......................... | 348/234 |
| 5,345,265 A * | 9/1994 | Kim | ............................ | 348/254 |
| 5,534,916 A * | 7/1996 | Sakaguchi | .................. | 348/255 |
| 5,548,330 A * | 8/1996 | Hieda et al. | ................. | 348/234 |
| 5,581,298 A * | 12/1996 | Sasaki et al. | ................ | 348/237 |
| 5,671,023 A * | 9/1997 | Nishiwaki et al. | ........... | 348/675 |
| 5,818,521 A * | 10/1998 | Hieda | ......................... | 348/254 |
| 6,353,488 B1 * | 3/2002 | Hieda et al. | ............. | 348/222.1 |
| 6,990,250 B2 * | 1/2006 | Nakakuki | .................... | 382/266 |
| 7,307,657 B2 * | 12/2007 | Miyahara | .................... | 348/237 |
| 7,362,361 B2 * | 4/2008 | Matsukawa | ................. | 348/241 |

(Continued)

FOREIGN PATENT DOCUMENTS

JP    59-123388    7/1984

(Continued)

OTHER PUBLICATIONS

Translation of Japanese Publ. No. 11-112837 A.*

(Continued)

*Primary Examiner*—John M Villecco
(74) *Attorney, Agent, or Firm*—Straub and Pokotylo; John C. Pokotylo

(57) ABSTRACT

Briefly, a camera according to the present invention includes a first signal processing system having a first gamma conversion processing unit for subjecting an output from an image pick-up device to gamma conversion processing and a luminance signal generating unit for generating a luminance-system signal based on an output from the first gamma conversion processing unit, and a second signal processing system having a color signal generating unit for generating a color-system signal based on an output which is the output from the image pick-up device and which is not subjected to the gamma conversion processing.

10 Claims, 10 Drawing Sheets

U.S. PATENT DOCUMENTS

| | | | |
|---|---|---|---|
| 7,382,406 B2 * | 6/2008 | Higuchi | 348/241 |
| 2002/0039142 A1 * | 4/2002 | Zhang | 348/234 |
| 2006/0158536 A1 * | 7/2006 | Nakayama | 348/254 |
| 2007/0195178 A1 * | 8/2007 | Ooishi | 348/241 |

FOREIGN PATENT DOCUMENTS

| | | | |
|---|---|---|---|
| JP | 04298191 A * | 10/1992 | |
| JP | 08009199 A * | 1/1996 | |
| JP | 09-130816 | 5/1997 | |
| JP | 09-307913 | 11/1997 | |
| JP | 11-112837 | 4/1999 | |
| JP | 11-313338 | 11/1999 | |
| JP | 2001103507 A * | 4/2001 | |
| JP | 2001-320722 | 11/2002 | |

OTHER PUBLICATIONS

Japanese Office Action For Japanese Application Serial No. 2002-109660, mailed Jan. 30, 2007 (2 pgs.).

* cited by examiner

| y\x | 0 | 1 | 2 | 3 | --- |
|---|---|---|---|---|---|
| 0 | R(0,0) | Gr(1,0) | R(2,0) | Gr(3,0) | |
| 1 | Gb(0,1) | B(1,1) | Gb(2,1) | B(3,1) | |
| 2 | R(0,2) | Gr(1,2) | R(2,2) | Gr(3,2) | |
| 3 | Gb(0,3) | B(1,3) | Gb(2,3) | B(3,3) | |
| 4 | R(0,4) | Gr(1,4) | R(2,4) | Gr(3,4) | |
| 5 | Gb(0,5) | B(1,5) | Gb(2,5) | B(3,5) | |

| x<br>y | 0 | 1 | 2 | 3 | --- |
|---|---|---|---|---|---|
| 0 | Y(0,0) | Y(1,0) | Y(2,0) | Y(3,0) | |
| 1 | Y(0,1) | Y(1,1) | Y(2,1) | Y(3,1) | |
| 2 | Y(0,2) | Y(1,2) | Y(2,2) | Y(3,2) | |
| 3 | Y(0,3) | Y(1,3) | Y(2,3) | Y(3,3) | |
| 4 | Y(0,4) | Y(1,4) | Y(2,4) | Y(3,4) | |
| 5 | Y(0,5) | Y(1,5) | Y(2,5) | Y(3,5) | |

| x<br>y | 0 | 1 | 2 | --- |
|---|---|---|---|---|
| 0 | -1 | 0 | -1 | |
| 1 | 0 | 4 | 0 | |
| 2 | -1 | 0 | -1 | |

IMAGE SIGNAL PROCESSING SYSTEM AND CAMERA FOR OBTAINING LUMINANCE-SYSTEM SIGNAL AND COLOR-SYSTEM SIGNAL

This application claims benefit of Japanese Application No. 2002-109660 filed in Japan on Apr. 11, 2002, the contents of which are incorporated by this reference.

BACKGROUND OF THE INVENTION

1. Field of the Invention

The present invention relates to an image signal processing system and a camera having the image signal processing system.

2. Description of the Related Art

Conventionally, a so-called electronic still camera or a digital camera (hereinafter, referred to as an electronic camera or simply referred to as a camera) is generally and widely spread. In the electronic camera, a subject image which is optically formed by using a photographing optical system having a photographing lens and the like is photoelectrically converted by image pick-up means including an image pick-up device and the like such as a charge coupled device (hereinafter, briefly referred to as a CCD). The photoelectrically converted electrical signal (image signal indicating an image) is subjected to compression processing such as a predetermined-form image data (e.g., JPEG (Joint Photographic Experts Group)) method and is electronically recorded.

In the conventional electronic camera using the CCD as the image pick-up means, normally, an output signal, namely, an image signal generated and outputted through photoelectric conversion processing using the image pick-up device (CCD) mixedly includes random noises such as shot noise.

Then, in the above-mentioned conventional electronic camera, an operation for displaying a preferred image to display means generally requires various signal processing for suppressing or removing noise components and the like from an output signal (image signal) from the image pick-up device (CCD). Usually, an operation for accurately displaying the subject image to be displayed based on the image signal further requires various signal processing of the image signal, such as various correction processing.

Hence, the general and conventional electronic camera comprises a system for generating an image signal or image data which is most proper to a display operation of the image or a recording operation of the electrical signal indicating the image based on the output signal from the image pick-up device (CCD), namely, an image signal processing system.

For example, Japanese Unexamined Patent Application Publication No. 9-130816, Japanese Unexamined Patent Application Publication No. 11-112837, etc. propose the above-mentioned conventional image signal processing systems.

In the image signal processing system disclosed in Japanese Unexamined Patent Application Publication No. 9-130816, the image signal is subjected to coring processing and gamma correction processing. Further, the image signal is subjected to edge emphasis processing (contour correction processing), luminance signal generation processing, and chroma signal generation processing based on the output signal generated by the gamma correction processing.

SUMMARY OF THE INVENTION

Accordingly, it is an object of the present invention to provide an image signal processing system for generating preferable image data by devising various signal processing performed based on an image signal captured by an image pick-up device, and a camera using the image signal processing system.

Briefly, a camera according to the present invention includes a first signal processing system having a first gamma conversion processing unit for subjecting to gamma conversion processing an output from an image pick-up device and a luminance signal generating unit for generating a luminance-system signal based on an output from the first gamma conversion processing unit, and a second signal processing system having a color signal generating unit for generating a color-system signal based on an output which is the output from the image pick-up device and which is not subjected to the gamma conversion processing.

This feature and advantages of the present invention will become further apparent from the following detailed explanation.

DESCRIPTION OF THE PREFERRED EMBODIMENTS

Hereinbelow, a description is given of an embodiment of the present invention.

A description is given of the schematic structure of an image signal processing system used for a general electronic camera with reference to the drawings.

Figure 13:
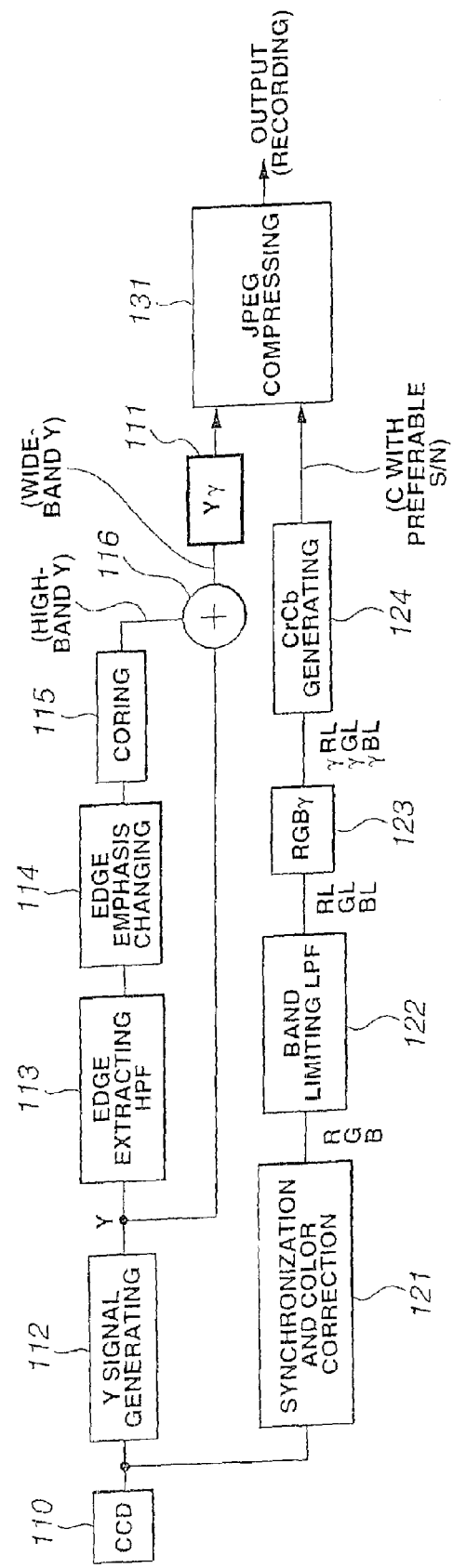
FIG. 13 is a block diagram schematically showing one example of an image signal processing system used for a general electronic camera.

FIG. 13 is a block diagram schematically showing one example of the image signal processing system used for the general electronic camera.

The image signal processing system comprises: a solid image pick-up device (CCD) 110 such as a CCD for receiving an optical subject image formed through a photographing optical system (not shown), for performing photoelectric conversion processing, and for generating an image signal based on the subject image; a Y signal generating unit 112 for receiving an output signal from the CCD 110, that is, an output signal through predetermined signal processing, e.g., correlation double sampling processing, automatic gain control processing, and analog/digital signal conversion processing, and for extracting and generating a luminance signal (hereinafter, referred to as a Y signal); a high-pass filter (HPF) unit 113 for generating a contour signal (hereinafter, referred to as an edge signal) which extracts a high-frequency component (removes a low-frequency component) from the Y signal generated by the Y signal generating unit 112; an edge emphasis changing unit 114 for multiplying a predetermined coefficient by the edge signal generated by the HPF unit 113 and for generating the edge signal having a changed edge emphasis; a coring unit 115 for generating the edge signal having a high-band characteristic and a suppressed noise component through coring processing by receiving the edge signal having the edge emphasis changed by the edge emphasis changing portion 114, by suppressing or removing the noise component in the image, by improving an S/N ratio (signal/noise ratio), and by thus generating a predetermined edge signal; an adder 116 for generating the Y signal with a wide-band characteristic and edge emphasis by adding the high-band Y signal generated by the coring unit 115 and the Y signal generated by the Y signal generating unit 112; a gamma correcting (Yγ) unit 111 for generating the final Y signal by receiving the Y signal with the wide band generated and outputted by the adder 116 and by performing gamma (γ) correction processing; a synchronization and color correcting unit 121 for performing predetermined synchronization processing so as to extract color signals (hereinafter, referred to as C signals including an R signal, a G signal, and a B signal) based on the output signal from the CCD 110 and for performing predetermined color correction processing; a low-pass filter (LPF) unit 122 for limiting the band for generating color signals (including an RL signal, a GL signal, and a BL signal) obtained by extracting the low-frequency component (removing the high-frequency component) from the color signals (including the R signal, G signal, and B signal) subjected to the synchronization and color correction processing by the synchronization and color correcting unit 121; a color gamma correcting unit (RGBγ unit) 123 which subjects the color signals (including the RL signal, the GL signal, and the BL signal) generated by the LPF unit 122 to gamma correction processing; a CrCb generating unit 124 for finally generating chroma signals (a Cr signal and a Cb signal) with a preferable S/N ratio based on color signals (including a γRL signal, a γGL signal, and a γBL signal) subjected to color gamma correction processing by the RGBγ unit 123; and a JPEG compressing unit 131 for generating the image signal having JPEG compressing data by the chroma signal (including the Cr signal and Cb signal) generated by the CrCb generating unit 124 and by the Y signal generated by the Yγ unit 111, and for outputting the generated image signal to a recording unit (not shown) for recording the image.

Figure 14:
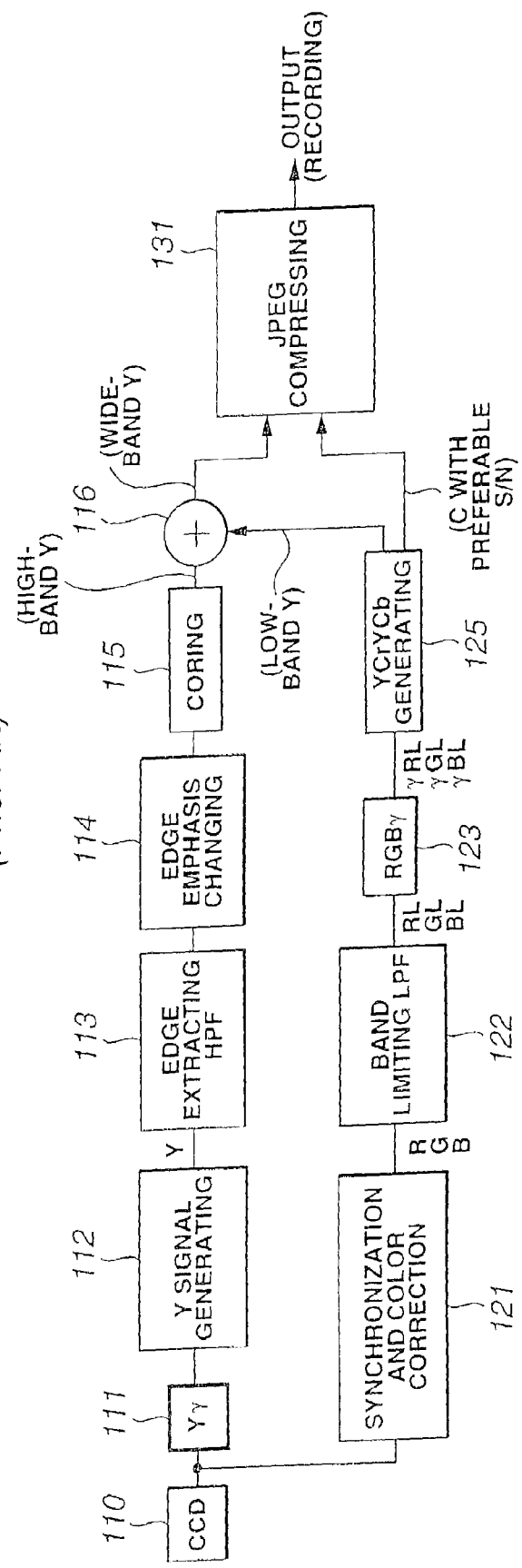
FIG. 14 is a block diagram schematically showing another example of the image signal processing system used for the general digital camera.

FIG. 14 is a block diagram showing another example of the image signal processing system used for the conventional and general electronic camera.

Referring to the other example shown in FIG. 14, the structure of the image signal processing system is the same as that of the electronic camera disclosed in Japanese Unexamined Patent Application Publication No. 11-112837.

The image signal processing system of the other example shown in FIG. 14 is substantially the same structure as that in the one shown in FIG. 13 and, however, the processing for generating the Y signal is different.

That is, the image signal processing system shown in FIG. 14 comprises: a solid image pick-up device (CCD) 110 such as a CCD which receives an optical subject image formed by a photographing optical system (not shown) and is subjected to the photoelectric conversion processing, and which generates an image signal based on the subject image; a gamma correcting (Yγ) unit 111 which receives an output signal from the CCD 110, namely, the output signal through predetermined signal processing such as the correlation double sampling processing, the automatic gain control processing, and the analog/digital signal conversion processing and which subjects the luminance signal (Y signal) to the gamma correction processing; a Y signal generating unit 112 which receives the output signal from the Yγ unit 111 and which extracts and generates the Y signal; a high-pass filter (HPF) unit 113 which generates an edge signal from the Y signal generated by the Y signal generating unit 112; an edge emphasis changing unit 114 which generates the edge signal obtained by changing the edge emphasis of the edge signal generated by the HPF unit 113; a coring unit 115 which receives the edge signal generated by the edge emphasis changing unit 114, subjects the edge signal to coring processing, and generates the edge signal with a high-band characteristic and a suppressed noise component; a synchronization and color correcting unit 121 which performs predetermined synchronization processing based on the output signal from the CCD 110 and performs predetermined color correction processing; a low-pass filter (LPF) unit 122 for limiting the band which generates color signals (including an RL signal, a GL signal, and a BL signal) obtained by extracting a low-frequency component (removing the high-frequency component) from the color signals (including an R signal, a G signal, and a B signal) subjected to the synchronization and color correction processing by the synchronization and color correcting portion 121; a color gamma correcting unit (RGBγ unit) 123 which subjects the color signals (including the RL signal, the GL signal, and the BL signal) generated by the LPF unit 122 to gamma correction processing; a YCrCb generating unit 125 for generating the color signals with a preferable S/N ratio including the low-band Y signal based on color signals (including a γRL signal, a γGL signal, and a γBL signal) subjected to color gamma correction processing by the RGBγ unit 123; an adder 116 for generating the wide-band Y signal with a wide-band characteristic by adding the low-band Y signal generated by the YCrCb generating unit 125 and the high-band Y signal generated by the coring unit 115; and a JPEG compressing unit 131 for generating the image signal having JPEG compressing data by the wide-band Y signal generated and outputted by the adder 116 and the chroma signal (including the Cr signal and Cb signal) in the YCrCb signal generated by the YCrCb generating unit 125 and for outputting the generated image signal to a recording unit (not shown) for recording the image.

Briefly, in the other example shown in FIG. 14, the image signal processing system comprises two distinct signal processing systems: a signal processing system for generating the high-band Y signal (edge signal) subjected to the edge emphasis processing and a signal processing system for generating the low-band Y signal. A desired wide-band Y signal is generated by adding the high-band Y signal and the low-band Y signal which are generated by the respective signal processing systems. In this case, the low-band Y signal is generated together with the chroma signal in the signal processing system for a color-system signal.

However, in the examples of the above-mentioned conventional image signal processing systems shown in FIGS. 13 and 14, there is a problem that a desired Y signal is not obtained.

That is, in the example of the conventional general image signal processing system shown in FIG. 13, a signal processing system using the Y signal (the processing in from the Y signal generating unit 112 to the Yγ unit 111) executes the gamma correction processing (Yγ unit 111) of the Y signal after generating the Y signal.

On the other hand, in the one example shown in FIG. 13, the CrCb generating unit 124 in the chroma signal processing system (the processing in from the synchronization and color correcting unit 121 to the CrCb generating unit 124) generally executes the following processing. Namely, the RGBγ unit 123 first generates a predetermined Y signal based on the γRL signal, the γGL signal, and the γBL signal which are subjected to the color gamma correction processing by the RGBγ unit 123. Herein, the Y signal is calculated based on a general calculating formula (1).

[Formula 1]

$$Y = 0.3R + 0.59G + 0.11B \quad (1)$$

The Cr signal is generated by subtracting the Y signal calculated by the above formula (1) from the γRL signal. The Cb signal is generated by subtracting the Y signal calculated by the above formula (1) from the γBL signal.

In other words, the Y signal is generated as mentioned above in the processing for generating the Cr signal and the Cb signal. However, the Y signal is generated based on the signal through the gamma correction processing of the RGBγ unit 123 as shown in FIG. 13.

Therefore, in the example shown in FIG. 13, the Y signal processing system performs the gamma correction processing in the final stage of the processing. On the other hand, the chroma signal processing system performs the processing for generating the chroma signal (C signal) based on the signal through the gamma correction processing. The foregoing includes a problem that a contradiction is caused in the calculating result.

Further, in the one example shown in FIG. 13, the Y signal is subjected to the gamma correction processing (Yγ unit 111) based on the signal through the coring processing. This case includes the following problem.

In other words, in the one example of the image signal processing system shown in FIG. 13, the edge emphasis processing is executed by the HPF unit 113. A processing result of the edge emphasis processing is indicated in FIG. 15.

Figure 15:
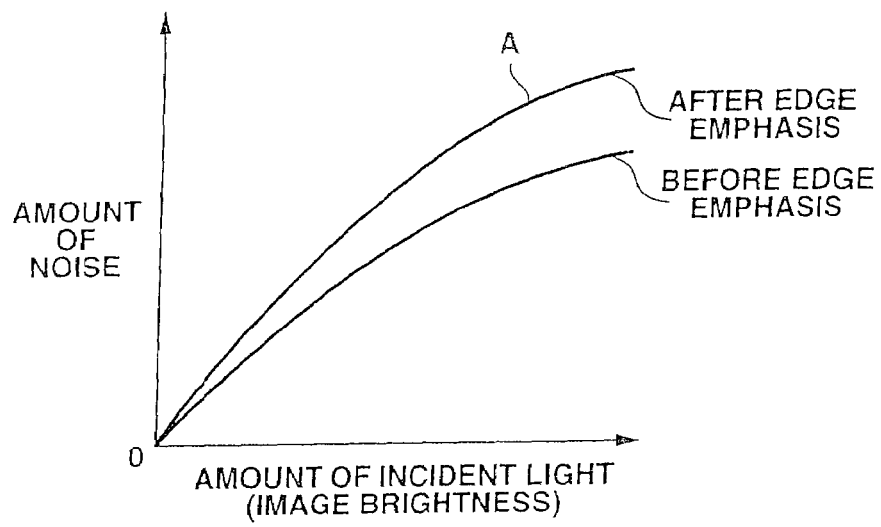
FIG. 15 is a diagram showing a processing result of the edge emphasis processing in the image signal processing system shown in FIG. 13.

FIG. 15 is a diagram showing the processing result of the edge emphasis processing in the example of the image signal processing system shown in FIG. 13. Referring to FIG. 15, the axis of ordinate denotes the amount of noise and the axis of abscissa denotes the amount of incident light, namely, the brightness of the image.

In general, a noise component in the image signal generated by the image pick-up device such as the CCD mainly includes, so-called shot noise. Thus, as the amount of incident light increases, the amount of noise included in the image signal increases.

Upon executing the edge emphasis processing for extracting the edge component from the above image signal, the noise component is extracted as the edge component. Referring to FIG. 15, it is understood that the amount of noise included in the entire image signals after the edge emphasis processing is increased as compared with the image signal before the processing. Since the amount of noise increases as the luminance is higher, a larger edge-component is extracted in a higher-luminance area due to this.

Sequentially, the coring processing is executed based on the signal after the edge emphasis processing. In the coring processing, the S/N ratio is improved by suppressing the noise component of the edge signal.

Figure 16:
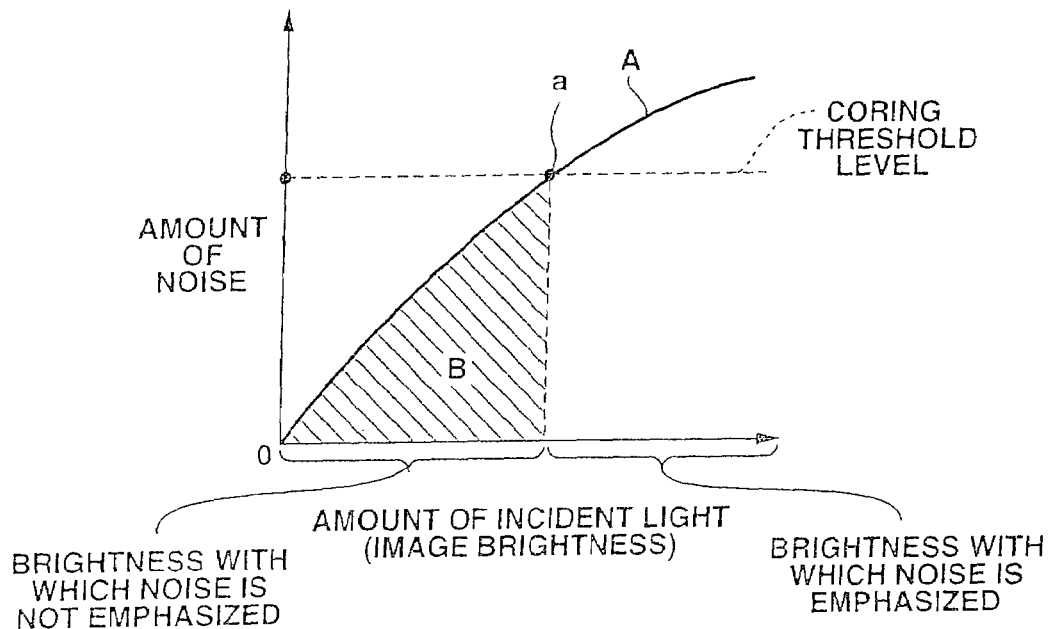
FIG. 16 is a diagram showing s setting value of the coring threshold level in the image signal processing system shown in FIG. 13.

FIG. 16 is a diagram showing a setting value of a coring threshold level in the example of the image signal processing system shown in FIG. 13. Referring to FIG. 16, the axis of ordinate denotes the amount of noise and the axis of abscissa denotes the amount of incident light, namely, the brightness of the image.

In the system shown in the example of FIG. 13, the coring threshold level is set as shown by a dotted line in FIG. 16. In this case, when an intersection a is formed by a coring threshold level |a| and a line segment A indicating the image signal, the noise component is not emphasized in a range B as a low-luminance area of the intersection a and the noise component remains in a range C as a high-luminance area of the intersection a.

Figure 17:
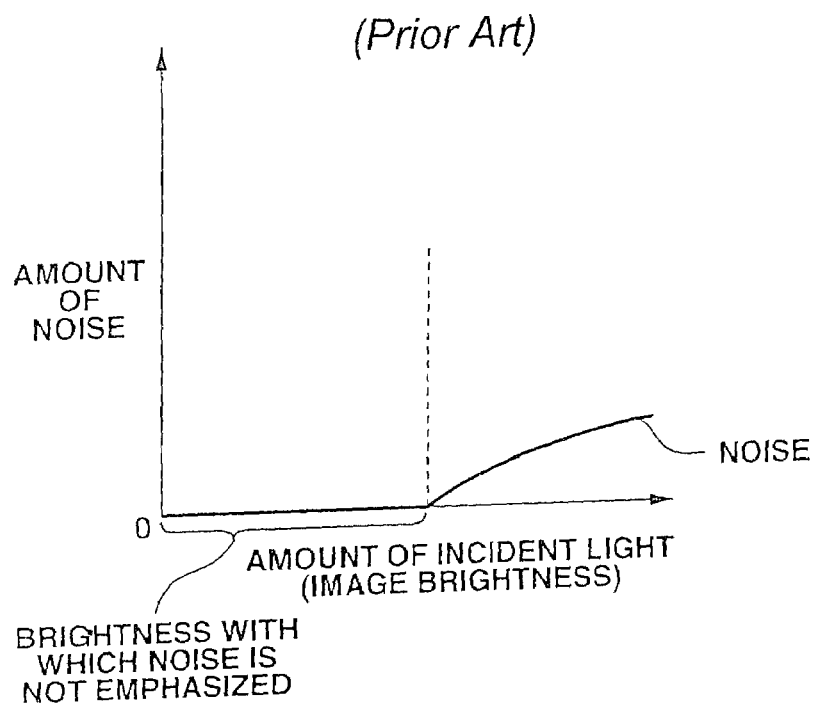
FIG. 17 is a diagram showing a processing result of the coring processing in the image signal processing system shown in FIG. 13.

As a result, the signal subjected to the coring processing is generated, containing the signal having the noise component as shown in FIG. 17.

FIG. 17 is a diagram showing the processing result of the coring processing in the example of the image signal processing system in the one example shown in FIG. 13. Referring to FIG. 17, the axis of ordinate denotes the amount of noise and the axis of abscissa denotes the amount of incident light (brightness of the image).

The signal generated through the above coring processing is subjected to the gamma correction processing.

Figure 18:
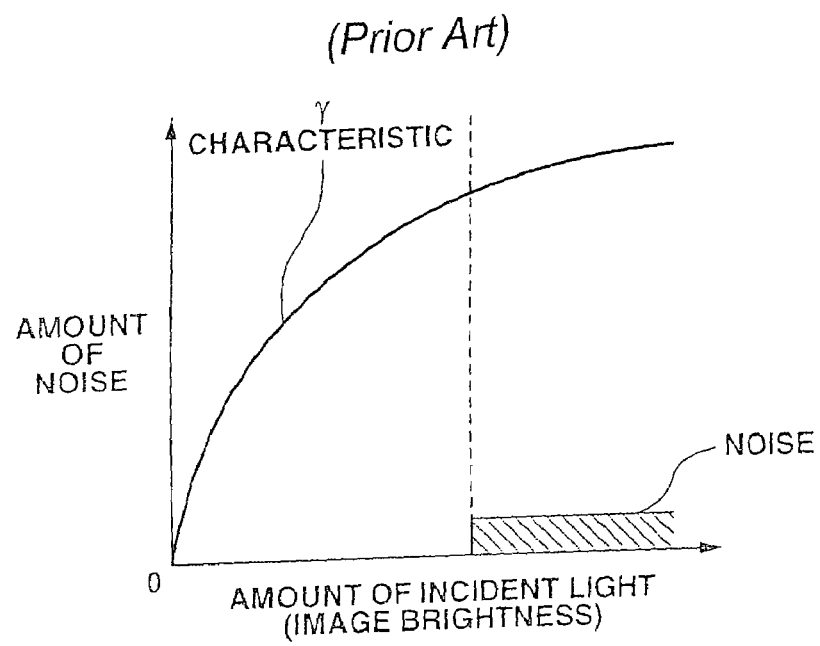
FIG. 18 is a diagram showing a processing result of the gamma correction processing in the image signal processing system shown in FIG. 13.

FIG. 18 is a diagram showing the processing result of the gamma correction processing in the example of the image signal processing system shown in FIG. 13.

Referring to FIG. 18, a gamma characteristic curve is slowly inclined. Therefore, as the luminance is higher, the signal is compressed. Thus, the noise component is suppressed at a portion near the high luminance. However, the predetermined amount of noise component remains in the finally generated image signal.

The complete suppression of the noise component needs the increase of the setting of the coring threshold level. In this case, not only the noise component but also the original high-frequency component is removed.

That is, when the edge component of the target signal is subjected to the coring processing, the coring threshold level is set to a high value so as to remove the noise component in the high-luminance area of the image and then the edge signal in the low-luminance area is removed together with the noise component as a result of the coring processing. As a consequence, this becomes a factor that the resolution of the image is insufficient in the low-luminance area. It is not preferable means for setting the coring threshold level to an unnecessary level in views of generating the preferable image data.

When the coring threshold level is set to be low so as to let the edge component remain in the low-luminance area as much as possible, the noise component in the high-luminance area is not sufficiently removed by the coring processing. Therefore, there is a problem that the noise component remains in the image signal generated by this.

In the conventional general image signal processing system as the example as shown in FIG. 14, when desired chroma signal and Y signal are generated based on the output signal from the CCD 110, the chroma signal and the low-band Y signal are generated by performing the same processing of the same processing system. Therefore, signal processing for generating the low-band Y signal and the chroma signal is performed based on the signal subjected to the band limitation using the same LPF 122.

In general, upon the chroma signal generation processing, the band limitation is largely performed in the band limitation processing of the LPF 122 so as to mainly reduce the unnecessary noise component. Thus, the advantage for reducing the noise is obtained. It is necessary to limit the band by the LPF 122 as much as at the low level so as to obtain the Y signal with the wider band.

In the conventional image signal processing system shown in FIG. 14, the band is largely limited in the band limitation processing of the LPF 122 in consideration of generating the chroma signal with the preferable S/N ratio. Then, the band of the simultaneously generated low-band Y signal is narrower than the desired band.

When the band is largely limited by the LPF 122 in consideration of generating the low-band Y signal in the wide band, an unnecessary noise component is not removed from the chroma signal which is simultaneously generated. Therefore, the desired chroma signal, namely, the chroma signal with the preferable S/N ratio is not generated.

As mentioned above, it is not easy to generate the chroma signal with the preferable S/N ratio and to generate the Y signal in the wide band by performing the same processing by the same processing system.

The present invention is devised in views of the above-mentioned points and embodiment is described hereinlater.

Figure 1:
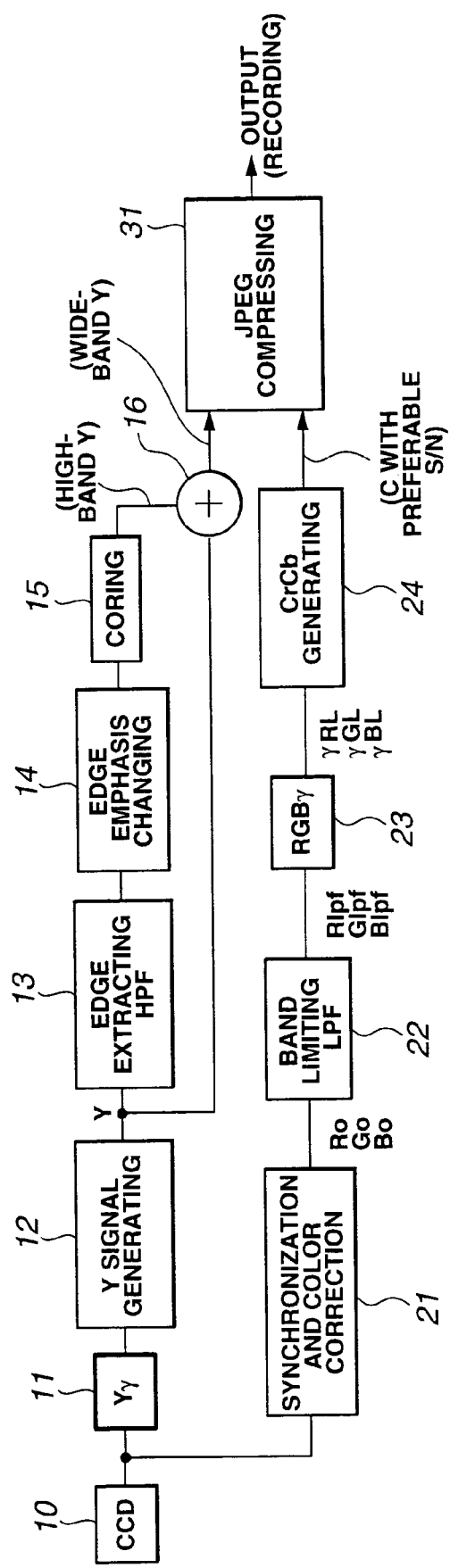
FIG. 1 is a block diagram schematically showing an image signal processing system in a camera according to an embodiment of the present invention.

FIG. 1 is a block diagram schematically showing an image signal processing system used for a camera according to an embodiment of the present invention. According to the embodiment of the present invention, the image signal processing system is used for an electronic camera system as an example.

Referring to FIG. 1, the image signal processing system of the electronic camera comprises: a solid image pick-up device (CCD) 10 such as a CCD for receiving an optical subject image formed through a photographing optical system (not shown), for performing photoelectric conversion processing, and for generating an image signal based on the subject image; a gamma correcting unit (Yγ unit) 11, as first γ correction processing means, for receiving an output signal (color image signal) through predetermined signal processing such as correlation double sampling processing, automatic gain control processing, and analog/digital signal conversion processing and for performing gamma correction processing (of the luminance signal); a Y signal generating unit 12, as luminance signal generating means, for receiving the image signal through the gamma correction processing in the Yγ unit 11, and for extracting and generating the Y signal (luminance signal); a high-pass filter (HPF) unit 13, as a part of edge emphasis processing means and band limiting means, for generating a contour signal (edge signal) which extracts a high-frequency component (removes a low-frequency component) from the Y signal generated by the Y signal generating unit 12; an edge emphasis changing unit 14, as a part of edge emphasis changing means, for multiplying a predetermined coefficient by the edge signal generated by the HPF unit 13 and for generating the edge signal having a changed edge emphasis; a coring unit 15, as coring processing means, for generating a predetermined edge signal having a high-band characteristic and a suppressed noise component through coring processing by receiving the edge signal having the edge emphasis changed by the edge emphasis changing portion 14, by suppressing or removing the noise component in the image, by improving an S/N ratio (signal/noise ratio), and by thus generating a predetermined edge signal; an adder 16 for generating the Y signal with the wide-band characteristic and edge emphasis by adding the signal generated by the coring unit 15 and the Y signal generated by the Y signal generating unit 12; a synchronization and color correcting unit 21, as color correction processing means, for performing predetermined synchronization processing so as to extract R signal, G signal, and B signal based on the output signal from the CCD 10 and for performing predetermined color correction processing; a low-pass filter (LPF) unit 22 for limiting the band, as band limiting means, for generating signals (including an RL signal, a GL signal, and a BL signal) obtained by extracting the low-frequency component (removing the high-frequency component) from the signals including the R signal, G signal, and B signal subjected to the synchronization and color correction processing by the synchronization and color correcting portion 21; a color gamma correcting unit (RGBγ unit) 23, as second gamma correction processing means, for performing the gamma correction processing of the signals including the RL signal, the GL signal, and the BL signal generated by the LPF unit 22; a CrCb generating unit 24, as chroma signal generating means, for finally generating a C signal, a Cr signal, and a Cb signal with a preferable S/N ratio based on color signals including a γRL signal, a γGL signal, and a γBL signal subjected to color gamma correction processing by the RGBγ unit 23; and a JPEG compressing unit 31 for generating the image signal having JPEG compressing data by the chroma signal including the Cr signal and Cb signal generated by the CrCb generating unit 24 and by the wide-band Y signal generated and outputted by the adder 16 and for outputting the generated image signal to a recording unit (not shown) for recording the image.

As mentioned above, the image signal processing system according to the embodiment comprises different processing systems, a first signal processing system and a second signal processing system. The first signal processing system comprises a signal processing system contributing to the generation of, mainly, the luminance signal (hereinafter, referred to as the Y signal), that is, a luminance signal processing system, including the first gamma correction processing means (Yγ unit 11) which performs the gamma correction processing of the output from the image pick-up device (CCD 10) and the luminance signal generating means (Y signal generating unit 12) which generates a luminance-system signal based on the output of the first gamma correction processing means (Yγ unit 11). The second signal processing system contributing to the generation of, mainly, the chroma signal (C signal), that is, a chroma signal processing system including the chroma signal generating means (CrCb generating unit 24) which generates a color-system signal based on the output from the image pick-up device (CCD 10) that is not subjected to the gamma correction processing.

The first signal processing system (luminance signal processing system) comprises the edge emphasis processing means (the HPF unit 13 and the edge emphasis changing unit 14) and the coring processing means (coring unit 15) at the rear stage of the luminance signal generating means (Y signal generating unit 12).

The second signal processing system (chroma signal processing system) comprises the color correction means (synchronization and color correction unit 21) for performing the color correction processing and the second gamma correction processing means (RGBγ unit 23) for performing the gamma correction processing at the front stage of the chroma signal generating means (CrCb generating unit 24) such that the both means functions in the above-mentioned order.

Further, the second signal processing system (color-system signal processing system) comprises the band limiting means (LPF unit 22) independently of the first signal processing system (luminance signal processing system). Incidentally, the second signal processing system may be constructed so as to generate not only the chroma signal (Cr signal and Cb signal) but also a color difference signal or a signal obtained by linearly converting the color difference signal, such as I signal and Q signal or U signal and V signal, as the color-system signal.

Here, the luminance signal processing system is described in detail.

The CCD 10 comprises predetermined-type color filters (also referred to as color filters). The color filters have RGB bayer alignments as shown in FIG. 2.

Figures 2, 3:
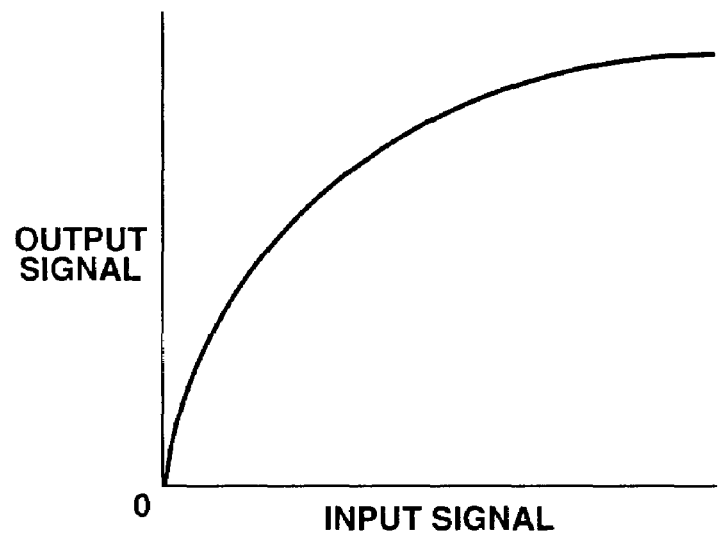
FIG. 2 is a diagram showing the alignment of color filter arrays arranged in front of a CCD of the camera shown in FIG. 1.
FIG. 3 is a diagram showing the concept of gamma correction processing of a Yγ unit in the image signal processing system shown in FIG. 1.

FIG. 2 is a diagram showing the alignment of color filter arrays arranged in front of the CCD 10 in the electronic camera according to the embodiment. Referring to FIG. 2, the configuration (coordinates) of the output signal from the CCD 10 is shown.

The Yγ unit 11 comprises a predetermined input end portion (not shown) for receiving the output signal from the CCD 10 or a color image signal substantially equivalent to the output signal.

The Yγ unit 11 receives input data (refer to FIG. 2) which is supplied from the CCD 10 via the input end portion, subjects the input data to predetermined gamma correction processing, and generates a non-linear output signal.

The gamma correction processing is a signal processing by which the reproduced image (display image) obtains accurate gradation characteristics on the display screen of display means for displaying the image based on the generated image data. The gamma characteristic of a CRT (Cathode Ray Tube, so-called Braun tube) as general display means is 2.22. A gamma correcting coefficient used for the gamma correction processing is as follows.

$$\gamma = 1/2.22$$
$$\approx 0.45$$

Therefore, the correction is performed so as to obtain the above value in the gamma correction processing.

FIG. 3 is a diagram showing the concept of the gamma correction processing of the Yγ unit 11 in the image signal processing system according to the embodiment.

In the RGBγ unit 23 in the chroma signal processing system, which will be described later, the similar color gamma correction processing is performed.

The Y signal generating unit 12 receives the output signal from the Yγ unit 11 and generates a predetermined luminance signal (Y signal). According to the embodiment, the luminance signal (Y signal) is generated from the RGB signals based on the following general calculating formula (1).

[Formula 1]

$$Y = 0.3R + 0.59G + 0.11B \quad (1)$$

Figures 4, 5, 6:
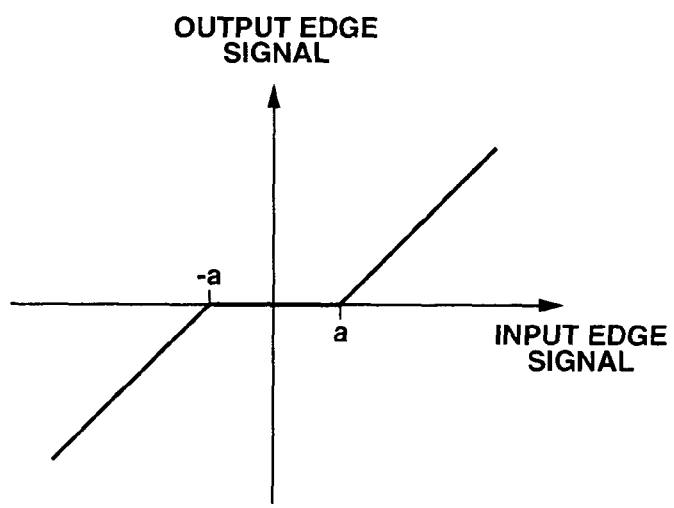
FIG. 4 is a diagram showing coordinates of a luminance signal corresponding to a CCD output signal shown in FIG. 2.
FIG. 5 is a diagram showing an HPF coefficient of a spatial filter (HPF) for extracting an edge in the image signal processing system shown in FIG. 1.
FIG. 6 is a diagram showing the concept of coring processing in the image signal processing system shown in FIG. 1.

FIG. 4 is a diagram showing coordinates of the luminance signal corresponding to the CCD output signal shown in FIG. 2.

The luminance signal of a coordinate Y(0, 0) in FIG. 4 is calculated by using the above formula (1), thereby obtaining the following formula (2).

[Formula 2] (2)

$$Y(0, 0) = [R(0, 0) Gr(1, 0) Gb(0, 1) B(1, 1)] \begin{pmatrix} 0.3 \\ 0.295 \\ 0.295 \\ 0.11 \end{pmatrix}$$

As mentioned above, the coordinate Y(0, 0) is generated based on four pixel signals from the CCD output signals shown in FIG. 2. That is, the four pixel signals are R(0, 0),
Gr(1, 0)
Gb(0, 1) and
B(1, 1).

The luminance signal of the coordinate Y(1, 0) in FIG. 4 is, as well, calculated by using the above formula (1), thereby obtaining the following formula (3).

[Formula 3] (3)

$$Y(1, 0) = [Gr(1, 0) R(2, 0) B(1, 1) Gb(2, 1)] \begin{pmatrix} 0.295 \\ 0.3 \\ 0.11 \\ 0.295 \end{pmatrix}$$

The coordinate Y(1, 0) is generated based on four pixel signals. That is, the four pixel signals are Gr(1, 0),
R(2, 0),
B(1, 1), and
Gb(2, 1).

The Y signal is similarly generated based on all the output signals from the CCD 10.

When generating the Y signal, the calculation using the formula (1) is performed based on the four pixel signals as mentioned above.

Here, the G signal includes two pixel signals of the Gr signal and Gb signal. In the formula (1), 0.59 is multiplied to the G signal. Thus, 0.295 (=(0.59/2)) is multiplied to the Gr signal and the Gb signal respectively.

The edge extracting HPF unit 13 generates an edge signal Edge (x, y) by multiplying the spatial filter (HPF) for extracting the edge to the Y signal generated by the Y signal generating unit 12 as shown in FIG. 5.

FIG. 5 is a diagram showing the HPF coefficient of the spatial filter (HPF) for extracting the edge in the image signal processing system according to the embodiment.

The edge signal Edge (x, y) is calculated by using the following formula (4) based on the Y signal having nine pixels and the HPF coefficient shown in FIG. 5.

[Formula 4]

$$Edge(x, y) = \Sigma(Y(ij)*k(ij)) \qquad (4)$$

Specifically, the edge signal is generated by calculation shown in the following formula (5).

[Formula 5] (5)

$$\begin{aligned}Edge(1, 1) = &\ Y(0, 0)*(-1) + Y(1, 0)*0 + Y(2, 0)*(-1) + \\ &\ Y(0, 1)*0 + Y(1, 1)*4 + Y(2, 1)*0 + \\ &\ Y(0, 2)*(-1) + Y(1, 2)*0 + Y(2, 2)*(-1)\end{aligned}$$

The edge emphasis changing unit 14 executes the predetermined edge emphasis changing processing of the generated edge signal. Therefore, the coring unit 15 executes the coring processing of the output signal.

FIG. 6 is a diagram showing the concept of the coring processing in the image signal processing system according to the embodiment.

In the coring processing according to the embodiment, the output is suppressed and is set to zero in the case of a small output signal within a range of input edge signals (−a) to a. That is, the small output signal, typically for example, the noise, is not subjected to the edge emphasis processing. Incidentally, in the coring processing, different positive and negative values may be set to the coring threshold level, that is, within the range of the input edge signals (−a) to a.

The adder 16 adds the above-generated edge signal and the Y signal generated by the Y signal generating unit 12, thereby generating a predetermined wide-band Y signal.

Next, the detail description is given of the chroma signal processing system.

Figure 7:
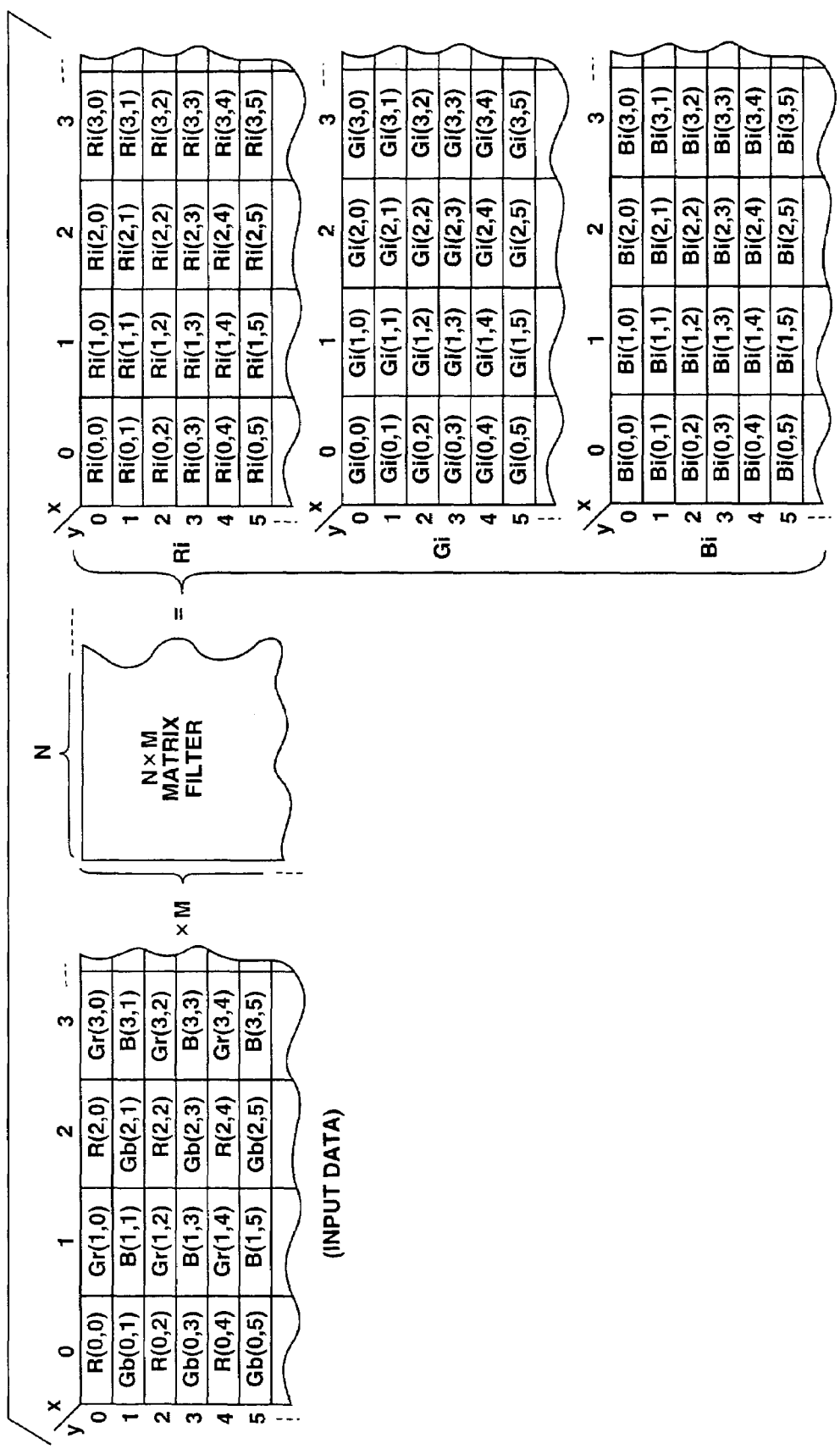
FIG. 7 is a diagram showing the concept of synchronization processing in the image signal processing system shown in FIG. 1.

FIG. 7 is a diagram showing the concept of the synchronization processing in the image signal processing system according to the embodiment.

The synchronization and color correcting unit 21 receives input data (refer to input data shown in FIG. 7; exactly the same as the input data shown in FIG. 2) of the output signal from the CCD 10 or the color image signal substantially equivalent to the output signal and performs the synchronization. The synchronization processing is interpolation processing which is performed by multiplying an (N×N) matrix shown in FIG. 7 to the input data of the color image signal. Thus, three image signals, namely, Ri, Gi, and Bi signals are generated.

Incidentally, in the electronic camera and its image signal processing system, the synchronization processing is conventional general-processing. Therefore, a detailed description thereof is omitted.

Next, the Ri, Gi, and Bi signals generated by the synchronization is subjected to the color correction processing. The color correction processing is performed based on the calculation shown in formulae (6), (7), and (8). In other words, the chroma signal is corrected by multiplying predetermined coefficients K1 to K9 to the chroma signal at the same coordinate.

[Formula 6]

$$Ro(x, y) = K1*Ri(x, y) + K2*Gi(x, y) + K3*Bi(x, y) \qquad (6)$$

[Formula 7]

$$Go(x, y) = K4*Ri(x, y) + K5*Gi(x, y) + K6*Bi(x, y) \qquad (7)$$

[Formula 8]

$$Bo(x, y) = K7*Ri(x, y) + K8*Gi(x, y) + K9*Bi(x, y) \qquad (8)$$

Thus, color correcting signals Ro, Go, and Bo are generated for the Ri, Gi, and Bi signals.

The color correction processing is generally put into practical use in the conventional electronic camera and its image signal processing system and therefore the detailed description thereof is omitted.

The LPF unit 22 subjects to the band limitation processing, the color-system signal subjected to the synchronization and the color correction processing in the synchronization and the color correcting unit 21. The band limitation processing is as the same as the processing of the edge extracting HPF unit 13 in the above Y signal processing system.

Figure 8:
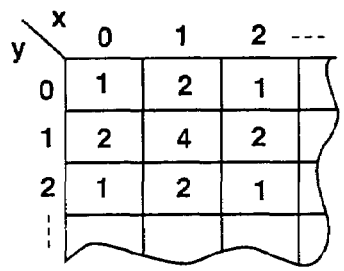
FIG. 8 is a diagram showing an LPF coefficient of a spatial filter (LPF) for limiting a band in the image signal processing system shown in FIG. 1.

That is, the LPF unit 22 generates signals Rlpf, Glpf, and Blpf which are subjected to the band limitation by multiplying the spatial filter (LPF) used for limiting the band shown in FIG. 8 to the chroma signal on which the synchronization and color correction processing are performed.

FIG. 8 is a diagram showing the LPF coefficient of the spatial filter (LPF) used for limiting the band in the image signal processing system according to the embodiment.

For example, the band-limited signal Rlpf (x, y) is calculated by using the following formula (9) based on the Ro signal having nine pixels and the HPF coefficient shown in FIG. 8.

[Formula 9]

$$Rlpf(x, y) = \Sigma(Ro(ij)*L(ij))/\Sigma L(ij) \qquad (9)$$

Specifically, the band-limited signal Rlpf (x, y) is generated by calculation shown in the following formula (12).

[Formula 12] (12)

$$\begin{aligned}Rlpf(1, 1) = &\ Ro(0, 0)*1 + Ro(1, 0)*2 + Ro(2, 0)*1 + \\ &\ Ro(0, 1)*2 + Ro(1, 1)*4 + Ro(2, 1)*2 + \\ &\ Ro(0, 2)*1 + Ro(1, 2)*2 + Ro(2, 2)*1\end{aligned}$$

Similarly, the band-limited signal Glpf (x, y) is calculated by using the following formula (10) based on the Go signal having nine pixels and the HPF coefficient shown in FIG. 8.

[Formula 10]

$$Glpf(x, y) = \Sigma(Go(ij)*L(ij))/\Sigma L(ij) \qquad (10)$$

Specifically, the band-limited signal Glpf (x, y) is generated by calculation shown in the following formula (13).

[Formula 13] (13)

$$\begin{aligned}Glpf(1, 1) = &\ Go(0, 0)*1 + Go(1, 0)*2 + Go(2, 0)*1 + \\ &\ Go(0, 1)*2 + Go(1, 1)*4 + Go(2, 1)*2 + \\ &\ Go(0, 2)*1 + Go(1, 2)*2 + Go(2, 2)*1\end{aligned}$$

Further, the band-limited signal Blpf (x, y) is calculated by the following formula (11) based on the Bo signal having nine pixels and the HPF coefficient shown in FIG. 8.

[Formula 11]

$$Blpf(x, y) = \Sigma(Bo(ij)*L(ij))/\Sigma L(ij) \qquad (11)$$

Specifically, the band-limited signal Blpf is generated by the calculation shown in the following formula 14.

[Formula 14] (14)

$$Blpf(1, 1) = Bo(0, 0)*1 + Bo(1, 0)*2 + Bo(2, 0)*1 + \\ Bo(0, 1)*2 + Bo(1, 1)*4 + Bo(2, 1)*2 + \\ Bo(0, 2)*1 + Bo(1, 2)*2 + Bo(2, 2)*1$$

The RGBγ unit 23 executes the predetermined gamma correction processing based on the above-generated and band-limited signals Rlpf, Glpf, and Blpf. After that, the CrCb generating unit 24 executes the CrCb generation processing of the output signals.

In the CrCb generation processing, the Y signals are generated from the band-limited signals Rlpf, Glpf, and Blpf by using the above formula (1) as shown in the following formula (15).

[Formula 15]

$$Y(x, y)=0.3*Rlpf(x, y)+0.59*Glpf(x, y)+0.11*Blpf(x, y) \quad (15)$$

The Cr signal is calculated by subtracting the Y signal generated by the formula (15) from the signal Rlpf. That is, the Cr signal is calculated as shown by the following formula (16).

[Formula 16]

$$Cr(x, y)=Rlpf(x, y)-Y(x, y) \quad (16)$$

The Cb signal is calculated by subtracting the Y signal generated by the above formula (15) from the signal Blpf. That is, the Cb signal is calculated as shown by the following formula (17).

[Formula 17]

$$Cb(x, y)=Blpf(x, y)-Y(x, y) \quad (17)$$

The above-generated Cr signal and Cb signal become the chroma signals C with a preferable S/N ratio.

Here, the embodiment will be described in views of a relationship between the gamma correction processing of the Y signal and the Y signal generation processing.

Table 1 shows the relationship between the gamma correction processing of the Y signal and the Y signal generation processing, and indicates processing in the image signal processing system according to the embodiment and processing in the conventional image signal processing system shown in FIG. 13.

image signal processing system in the example shown in FIG. 13.

As mentioned above, in the image signal processing system according to the embodiment, the output signal from the CCD 10 is set to the input data and the Y signal of the input data is subjected to the gamma correction processing. After that, the Y signal generating unit 12 generates the Y signal based on the processed signal (refer to FIG. 1).

On the other hand, in the conventional image signal processing system shown in FIG. 13, the Y signal is generated and thereafter the gamma correction processing is performed.

A specific description is given of the difference between the image signal processing system according to the embodiment and the conventional image signal processing system shown in FIG. 13 with reference to Table 1.

For example, when the output signal from the CCD (10, 110) or the color image signal equivalent to the output signal has the following values:

R signal=100,

G signal=0, and

B signal=0, through the Y signal generation processing and the gamma correction processing by both the systems, the calculating results are different as follows.

First, in the conventional image signal processing system shown in FIG. 13, the calculating result is obtained as shown in the column (B) in Table 1.

In other words, in the conventional image signal processing system shown in FIG. 13, the output signal (color image signal) from the CCD 110 is received and the predetermined Y signal generation processing is performed. Here, the Y signal generation processing is performed based on the following formula (1).

[Formula 1]

$$Y=0.3R+0.59G+0.11B \quad (1)$$

Therefore, the processing result of the Y signal generating unit 112 is shown in the column (B) in Table 1. That is, $$Y = 0.3 \times 100 + 0.59 \times 0 + 0.11 \times 0$$
$$= 30$$

TABLE 1

| Data input | | γ correction processing (Out = ((In/225) ^ 0.45) * 255) | Y generation processing (Y = 0.3R + 0.59G + 0.11B) |
|---|---|---|---|
| R:100 | (A) | R:167 | Y:50 |
| G:0 | | G:0 | |
| B:0 | | B:0 | |
| | | Y generation processing (Y = 0.3R + 0.59G + 0.11B) | γ correction processing (Out = ((In/225) ^ 0.45) * 255) |
| | (B) | Y:30 | Y:97 |

(* Symbols "^" denotes power.)

Referring to Table 1, a column (A) shows a part of the processing in the image signal processing system according to the embodiment, and a column (B) shows a part of the The thus-generated Y signal (=30) is subjected to the predetermined signal processing as mentioned above with reference to FIG. 13. Then, the Yγ unit 111 finally performs the gamma correction processing. In this case, the gamma correction processing is obtained by the following formula as shown in the column (B) in Table 1.

$$Out=((In/255)^{\wedge}0.45) \times 255$$

Here, symbol Out denotes the output signal and symbol In denotes the input signal. In this case, the input signal In corresponds to the Y signal which is generated by the above formula (1) and is thereafter subjected to various signal processing. It is assumed that the gamma correcting coefficient γ is equal to 0.45. Therefore, the processing result in the Yγ unit 111 is as follows.

$$Out = ((In/255)^{\wedge}0.45) \times 255$$
$$= ((30/255)^{\wedge}0.45) \times 255$$
$$\approx 97$$

Here, symbol ^ denotes the power. That is, the Y signal (=97) finally outputted is obtained.

On the contrary, in the image signal processing system according to the embodiment, the output signal from the CCD 10 or the color image signal equivalent to the output signal has the following values:

R signal=100,
G signal=0, and
B signal=0, through the gamma correction processing and the Y signal generation processing, the calculating result is obtained as shown by the column (A) in Table 1.

In the image signal processing system according to the embodiment, as shown in FIG. 1, the output signal (color image signal) is received from the CCD 10 and the Yγ unit 11 first executes the gamma correction processing. In this case, the gamma correction processing is obtained by the following formula as shown by the column (A) in Table 1.

$$Out=((In/255)^{\wedge}0.45) \times 255$$

Here, symbol Out denotes the output signal and symbol In denotes the input signal. In this case, the input signal In corresponds to the Y signal which is generated by the above formula (1) and is thereafter subjected to various signal processing. It is assumed that the gamma correcting coefficient γ is equal to 0.45. Therefore, the processing result in the Yγ unit 11 is as follows.

$$Out = ((In/255)^{\wedge}0.45) \times 255$$
$$= ((100/255)^{\wedge}0.45) \times 255$$
$$\approx 167$$

Here, symbol ^ denotes the power. That is, the color image signal is generated with R signal=167,
G signal=0, and
B signal=0.

The generated color image signal is subjected to the Y signal generation processing. The Y signal generation processing is based on the following formula (1).

[Formula 1]

$$Y=0.3R+0.59G+0.11B \qquad (1)$$

Hence, the processing result of the Y signal generating unit 12 is shown in the column (A) in Table 1. That is, $$Y = 0.3 \times 167 + 0.59 \times 0 + 0.11 \times 0$$
$$= 50$$

That is, the Y signal (=50) finally outputted is obtained.

As mentioned above, the generated Y signal has varied values depending on whether the gamma correction processing is performed before the Y signal generation processing or after that.

In both the image signal processing system according to the embodiment and the conventional one shown in FIG. 13, the same processing is implemented in the chroma signal processing system. In this case, the CrCb generating units 24 and 124 implement the CrCb generation processing based on the signal after the gamma correction processing of the RGBγ units 23 and 123 are respectively performed.

As mentioned above, the Y signal is generated in the CrCb generation processing. However, the same Y signal as that in the above Y signal processing system must be used.

However, in the example shown in FIG. 13, the latter stage portion performs the gamma correction processing in the Y signal processing system and the chroma signal is generated by the Y signal which is generated based on the signal after the gamma correction processing in the color-system signal processing system. Hence, as mentioned above with reference to Table 1, the Y signal (Y=97 in the column (B) of Table 1) in the Y signal processing system is different from the Y signal (Y=50 in the column (A) of Table 1) in the color-system signal processing system.

On the other hand, in the image signal processing system according to the embodiment, the Y signal in the Y signal processing system is substantially the same as the Y signal in the color-system signal processing system.

Namely, in the image signal processing system according to the embodiment, the Y signal in the Y signal processing system is subjected to the Y signal generation processing based on the signal after the gamma correction processing as mentioned above (refer to FIG. 1). The generated Y signal has a value of 50 as shown in the column (A) of Table 1.

In the image signal processing system according to the embodiment, the Y signal in the color-system signal processing system, in other words, the Y signal used for generating the chroma signal in the CrCb generation processing is generated based on the signal after the gamma correction processing in the RGBγ unit 23 at the front stage of the CrCb generating unit 24 (refer to FIG. 1). The generated Y signal has a value of 50 as shown in the column (A) of Table 1.

As described above, in the image signal processing system according to the embodiment, the Y signal generated in the Y signal processing system is substantially the same as the Y signal used for generating the chroma signal in the color signal processing system. Thus, no contradiction exists between the Y signal and the chroma signal which are generated in the image signal processing system according to the embodiment and the correct color reproduction is always realized.

Next, a description is given of the embodiment in views of a relationship between the gamma correction processing and the color correction processing of the chroma signal.

Table 2 shows the relationship between the gamma correction processing and the color correction processing of the chroma signal and indicates the processing in the image signal processing system according to the embodiment and the processing in the conventional image signal processing system.

processing is performed. Here, the gamma correction processing is performed based on the following formula as shown in the column (B) in Table 2.

TABLE 2

| Data input | | Color correction processing<br>(R = 1.2R - 0.1G - 0.1B)<br>(G = -0.1R + 1.2G - 0.1B)<br>(B = -0.1R - 0.1G + 1.2B) | γ correction processing<br>(Out = ((In/255) ^ 0.45) * 255) | deγ correction processing<br>(Out = ((In/255) ^ 2.22) * 255) |
|---|---|---|---|---|
| R:100<br>G:20<br>B:30 | (A) | R:115<br>G:11<br>B:24 | R:178<br>G:62<br>B:88 | R:115<br>G:11<br>B:24 |
| | | γ correction processing<br>(Out = ((In/255) ^ 0.45) * 255) | Color correction processing<br>(R = 1.2R - 0.1G - 0.1B)<br>(G = -0.1R + 1.2G - 0.1B)<br>(B = -0.1R - 0.1G + 1.2B) | deγ correction processing<br>(Out = ((In/255) ^ 2.22) * 255) |
| | (B) | R:167<br>G:81<br>B:97 | R:183<br>G:71<br>B:92 | R:122<br>G:15<br>B:26 |

(* Symbols "^" denotes power.)

Referring to Table 2, a column (A) shows a part of the processing in the image signal processing system according to the embodiment, and a column (B) shows a part of the conventional image signal processing system.

As mentioned above, in the image signal processing system according to the embodiment, the output signal from the CCD 10 is set to the input data and the synchronization and color correction processing unit 21 subjects the input data to the synchronization processing and the color correction processing. After that, the RGBγ unit 23 subjects the color-system signal to the γ correction processing (refer to FIG. 1 and the column (A) in Table 2).

On the other hand, in the conventional image signal processing system, as disclosed in Japanese Unexamined Patent Application Publication No. 9-130816, the color-system signal is subjected to the gamma correction processing and thereafter the color correction processing is performed based on the generated signal through the gamma correction processing (refer to the column (B) in Table 2).

A specific description is given of the difference between the image signal processing system according to the embodiment and the conventional image signal processing system with reference to Table 2.

For example, when the output signal from the CCD (10, 110) or the color image signal equivalent to the output signal has the following values R signal=100,
G signal=20, and
B signal=30, and the gamma correction processing and the color correction processing are performed by both the systems.

First, in the conventional image signal processing system, the calculating result is obtained as shown in the column (B) in Table 2.

In other words, in the conventional image signal processing system, the output signal (color image signal) from the CCD 110 is received and the predetermined gamma correction $$Out=((In/255)^{0.45})\times 255$$

Here, symbol Out denotes the output signal and symbol In denotes the input signal. In this case, the input signal In corresponds to the output signal (color image signal) from the CCD 110. It is assumed that the gamma correcting coefficient γ is equal to 0.45. Here, symbol ^ denotes the power. Therefore, the processing result of the gamma correction processing is as follows.

$$Out(R) = ((In(R)/255)^{\wedge}0.45)\times 255$$
$$= ((100/255)^{\wedge}0.45)\times 255$$
$$\approx 167$$
$$Out(G) = ((In(G)/255)^{\wedge}0.45)\times 255$$
$$= ((20/255)^{\wedge}0.45)\times 255$$
$$\approx 81$$
$$Out(B) = ((In(B)/255)^{\wedge}0.45)\times 255$$
$$= ((30/255)^{\wedge}0.45)\times 255$$
$$\approx 97$$

Hence, the processing result of the gamma correction processing is as shown in the column (B) in Table 2, that is, R signal=167,
G signal=81, and
B signal=97.

The thus-generated chroma signal is subjected to the color correction processing. Here, the color correction processing is performed by using the above-stated formulae (6) to (8) as shown in the column (B) in Table 2 (refer to FIG. 7). Here, coefficients K1 to K9 are set as follows.

That is,
K1=1.2
K2=−0.1
K3=−0.1

K4=−0.1

K5=1.2

K6=−0.1

K7=−0.1

K8=−0.1, and

K9=1.2

This enables the acquisition of synchronized signals (further, color-corrected signals) for generating the chroma signals having $$R = 1.2 \times 167 - 0.1 \times 81 - 0.1 \times 97$$

$$\approx 183,$$

$$G = -0.1 \times 167 + 1.2 \times 81 - 0.1 \times 97$$

$$\approx 71, \text{ and}$$

$$B = -0.1 \times 167 - 0.1 \times 81 + 1.2 \times 97$$

$$\approx 92$$

The image is reproduced and displayed based on the above-generated image data by using display means having a characteristic of a display luminance for a predetermined non-linear input. Upon this display operation, the non-linear characteristic is offset against the non-linear characteristic which is previously given to the signal supplied to the display means, thereby performing the proper display operation. The characteristic of the display means is de-gamma (deγ) characteristic. The de-gamma characteristic is indicated by the following formula shown in the column (B) in Table 2.

Out=((In/255)^2.22)×255

Here, symbol Out denotes the output signal and symbol In denotes the input signal. In this case, the input signal In corresponds to the color image signal including the color signal through the color correction processing. It is assumed that a de-gamma correcting coefficient deγ is equal to 2.22 which is a reciprocal of the gamma correcting coefficient γ (=0.45). Here, symbol ^ denotes the power. Therefore, the display characteristic of the display means is as follows by the de-gamma characteristic.

$$\text{Out } (R) = ((\text{In } (R)/255)\wedge 2.22) \times 255$$

$$= ((183/255)\wedge 2.22) \times 255$$

$$\approx 122$$

$$\text{Out } (G) = ((\text{In } (G)/255)\wedge 2.22) \times 255$$

$$= ((71/255)\wedge 2.22) \times 255$$

$$\approx 15$$

$$\text{Out } (B) = ((\text{In } (B)/255)\wedge 2.22) \times 255$$

$$= ((92/255)\wedge 2.22) \times 255$$

$$\approx 26$$

Hence, the processing result of the gamma correction processing is, as shown in the column (B) in Table 2, R signal=122, G signal=15, and B signal=26.

As will be understood, the signal under the influence of the de-gamma characteristic is different from the signal of the color-system after the gamma correction processing.

That is, in the conventional image signal processing system, the signal after the gamma correction processing is subjected to the color correction processing upon generating the image data. When the image is reproduced and displayed based on the thus-generated image data, the color reproductionability is not realized with accuracy.

On the contrary, in the image signal processing system according to the embodiment, when the output signal from the CCD 10 or the color image signal equivalent to the output signal has the following values R signal=100, G signal=20, and B signal=30, and the gamma correction processing and the color correction processing are performed. Then, the calculating result is obtained as shown in the column (A) in Table 2.

In other words, in the image signal processing system according to the embodiment, as shown in FIG. 1, the output signal (color image signal) from the CCD 10 is received and the synchronization and color correction processing is performed. Here, the color correction processing is performed based on the above-stated formulae (6) to (8) as shown in the column (A) in Table 2, similarly to the above conventional system (refer to FIG. 7). Coefficients K1 to K9 set here are the same as those in the conventional image signal processing system. Hence, the following signals are generated, that is, $$R = 1.2 \times 100 - 0.1 \times 20 - 0.1 \times 30$$

$$\approx 115$$

$$G = -0.1 \times 100 + 1.2 \times 20 - 0.1 \times 30$$

$$\approx 11, \text{ and}$$

$$B = -0.1 \times 100 - 0.1 \times 20 + 1.2 \times 30$$

$$\approx 24.$$

The RGBγ unit 23 subjects the above-generated color-system signal to the gamma correction processing. In this case, the gamma correction processing is obtained by the following formula as shown in the column (A) in Table 2.

Out=((In/255)^0.45)×255

Here, symbol Out denotes the output signal and symbol In denotes the input signal. In this case, the input signal In corresponds to the signal generated through the above color correction processing (color image signal). It is assumed that the gamma correcting coefficient γ is equal to 0.45. Here, symbol ^ denotes the power. That is, the gamma correction processing is similar to that in the conventional image signal processing system.

In the image signal processing system according to the embodiment, the processing result of the gamma correction processing is as follows.

$$\text{Out } (R) = ((\text{In } (R)/255)\wedge 0.45) \times 255$$

$$= ((115/255)\wedge 0.45) \times 255$$

$$\approx 178$$

$$\text{Out }(G) = ((\text{In }(G)/255)^{\wedge}0.45) \times 255$$
$$= ((11/255)^{\wedge}0.45) \times 255$$
$$\approx 62$$
$$\text{Out }(B) = ((\text{In }(B)/255)^{\wedge}0.45) \times 255$$
$$= ((24/255)^{\wedge}0.45) \times 255$$
$$\approx 88$$

Hence, the processing result of the gamma correction processing is, as shown in the column (A) in Table 2,
R signal=178,
G signal=62, and
B signal=88.

When reproducing and displaying the optimal-form image based on the image data including the above-generated color-system signal, the image data supplied to the display means is under the influence of the de-gamma characteristic shown as an example in the column (A) in Table 2. The de-gamma characteristic is expressed by the following formula.

$$\text{Out}=((\text{In}/255)^{\wedge}2.22) \times 255$$

Here, symbol Out denotes the output signal and symbol In denotes the input signal, similarly to those in the above gamma correction processing. In this case, the input signal In corresponds to the color image signal including the chroma signal subjected to the color correction processing. It is assumed that the de-gamma correcting coefficient deγ is equal to 2.22. Here, symbol ^ denotes the power. The de-gamma characteristic is the same as that in the conventional image signal processing system. Thus the influence of the de-gamma characteristic is as follows.

$$\text{Out }(R) = ((\text{In }(R)/255)^{\wedge}2.22) \times 255$$
$$= ((178/255)^{\wedge}2.22) \times 255$$
$$\approx 115$$
$$\text{Out }(G) = ((\text{In }(G)/255)^{\wedge}2.22) \times 255$$
$$= ((62/255)^{\wedge}2.22) \times 255$$
$$\approx 11$$
$$\text{Out }(B) = ((\text{In }(B)/255)^{\wedge}2.22) \times 255$$
$$= ((88/255)^{\wedge}2.22) \times 255$$
$$\approx 24$$

Hence, the processing result of the gamma correction processing is as shown in the column (B) in Table 2,
R signal=115,
G signal=11, and
B signal=24.

As mentioned above, the chroma signal under the influence of the de-gamma characteristic has the same result as that of the signal through the above color correction processing.

Namely, in the image signal processing system according to the embodiment, the color correction processing of the color-system signal is executed at an earlier stage than the gamma correction processing upon generating the image data. When the image is reproduced and displayed based on the above-generated image data, the color is accurately reproduced.

In other words, in the image signal processing system according to the embodiment, the color status of the reproduced and displayed image is easily expected upon generating the image data. Advantageously, the color correction processing is easy in consideration of the image upon the reproducing and display operation by using simple linear processing.

In the image signal processing system according to the embodiment, the gamma correction processing of the Y signal is implemented before the coring processing in the Y signal processing system as shown in FIG. 1.

A description is given of the flow for the Y signal processing system in the image signal processing system according to the embodiment in consideration of the foregoing.

First, the output signal (color image signal) from the CCD 10 is inputted to the Yγ unit 11. The Yγ unit 11 performs the gamma correction processing of the Y signal.

Figure 9:
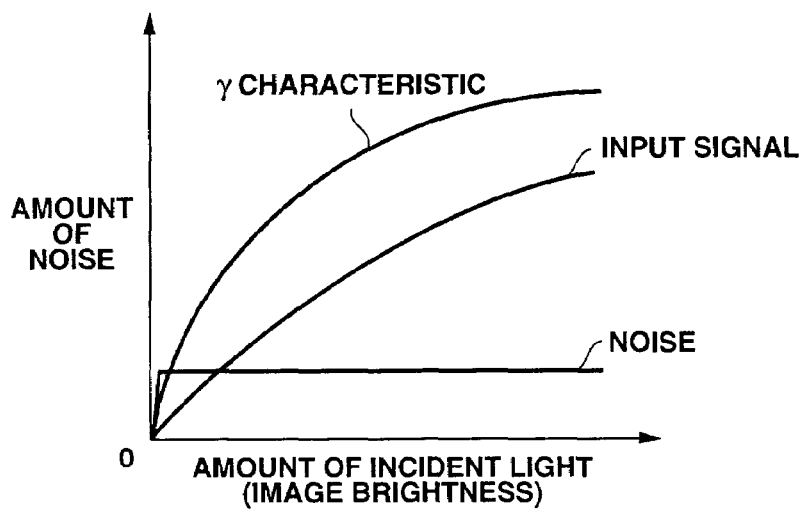
FIG. 9 is a diagram showing a processing result of the gamma correction processing in the image signal processing system shown in FIG. 1.

FIG. 9 is a diagram showing the processing result of the gamma correction processing in the image signal processing system according to the embodiment. Referring to FIG. 9, the axis of ordinate denotes the amount of noise and the axis of abscissa denotes the amount of incident light, namely, image brightness.

As shown in FIG. 9, through the execution of the gamma correction processing, the amount of noise of the input signal (the output signal from the CCD 10) to the Yγ unit 11 is substantially constant irrespective of the image brightness.

The above-generated signal is sequentially subjected to the edge emphasis processing. In this case, the LPF unit 13 performs the edge emphasis processing. The processing result of the edge emphasis processing is shown in FIG. 10.

Figure 10:
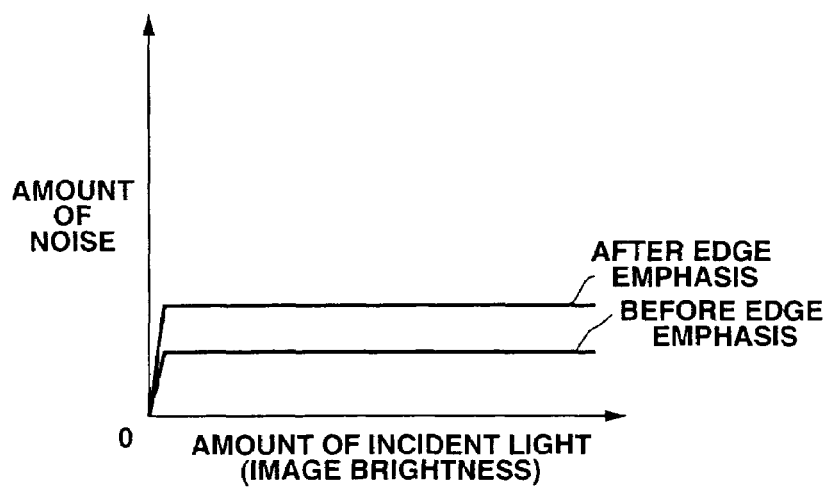
FIG. 10 is a diagram showing a processing result of edge emphasis processing in the image signal processing system shown in FIG. 1.

FIG. 10 is a diagram showing the processing result of the edge emphasis processing in the image signal processing system according to the embodiment. Referring to FIG. 10, the axis of ordinate denotes the amount of noise and the axis of abscissa denotes the amount of incident light, namely, image brightness (brightness).

As shown in FIG. 10, the amount of noise included in the entire image signal through the edge emphasis processing is increased overall as compared with the image signal before the processing.

Next, the coring processing is executed based on the signal subjected to the edge emphasis processing.

Figure 11:
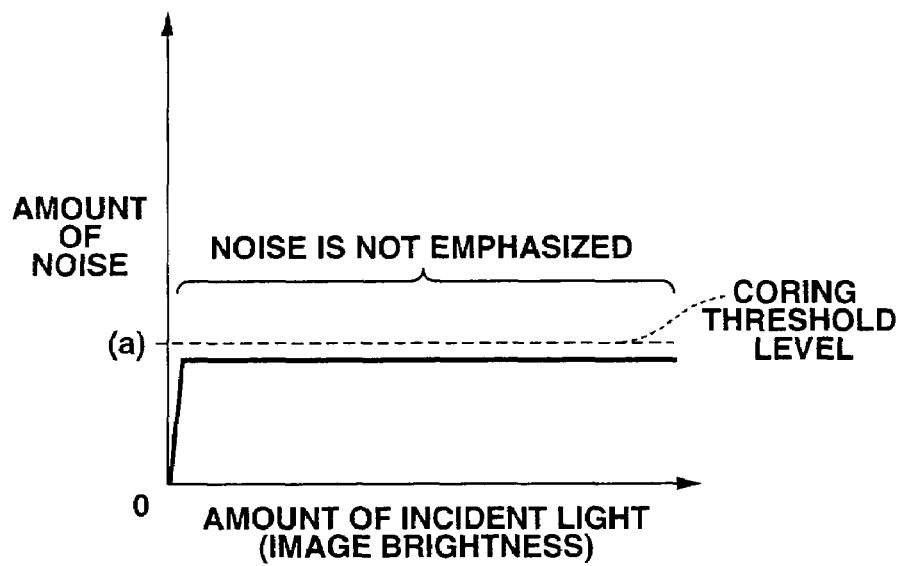
FIG. 11 is a diagram showing a setting value of a coring threshold level in the image signal processing system shown in FIG. 1.

FIG. 11 is a diagram showing a set value of the coring threshold level in the image signal processing system according to the embodiment. Referring to FIG. 11, the axis of ordinate denotes the amount of noise and the axis of abscissa denotes the amount of incident light, namely, image brightness.

In the image signal processing system according to the embodiment, the coring threshold level is set as shown by a dotted line in FIG. 11. In this case, the coring threshold level |a| is set to be constant irrespective of the image brightness. Therefore, since the amount of noise included in the target signal is substantially constant according to the embodiment, the coring threshold level |a| is set so as to remove substantially all the noise components. Thus, the noise component is not emphasized irrespective of the image brightness and, consequently, the signal after the coring processing becomes the signal excluding substantially all the noise component, namely, the signal nearly with the zero amount of noise, irrespective of the image brightness, as shown in FIG. 12.

Figure 12:
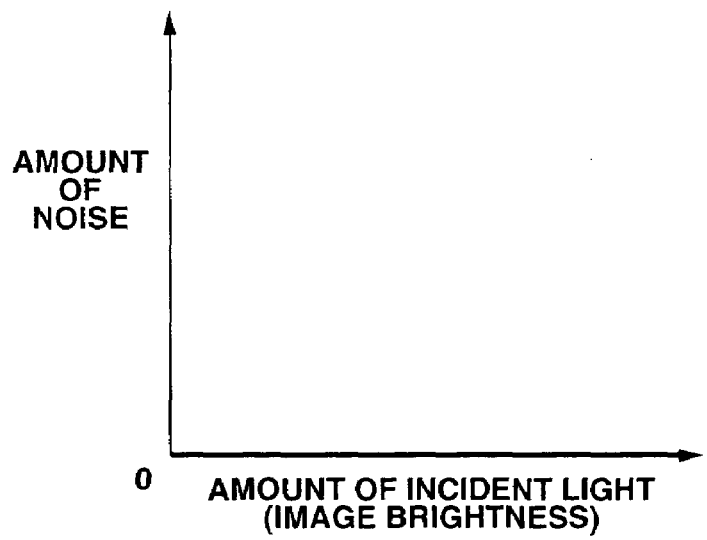
FIG. 12 is a diagram showing a processing result of coring processing in the image signal processing system shown in FIG. 1.

FIG. 12 is a diagram showing the processing result of the coring processing in the image signal processing system according to the embodiment. Referring to FIG. 12, the axis of ordinate denotes the amount of noise and the axis of abscissa denotes the amount of incident light, namely, image brightness.

As mentioned above, the image signal processing system comprises the Y signal processing system and the chroma signal processing system, independently, according to the embodiment. Thus, the band of the LPF unit 22 for limiting the band is set to be narrow in the chroma signal processing system. It is capable of providing the image signal processing system for always generating the chroma signal (C signal) in one processing system with the preferable S/N ratio without the influence to the luminance signal (Y signal) generated in another processing system and the camera using the image signal processing system.

In the image signal processing system according to the embodiment, the Y signal generated in the Y signal processing system is substantially the same as the Y signal used for generating the chroma signal in the chroma signal processing system. No contradiction exists between the Y signal and the chroma signal generated in the image signal processing system, and the color is always reproduced with accuracy.

That is, in the image signal processing system according to the embodiment, the gamma correction processing of the Y signal is performed before the execution of the Y signal generation processing. By setting the gamma characteristics substantially similarly in both the Yγ unit 11 and the RGBγ unit 23, the addition processing is performed without contradiction in the components between the generated wide-band Y signal and chroma signal (CrCb).

Further, in the image signal processing system according to the embodiment, the color correction processing is executed at an earlier stage than the gamma correction processing in the RGBγ unit. Thus, the color correction processing is executed in consideration of the image which is finally displayed.

Further, in the image signal processing system according to the embodiment, the gamma correction processing is executed at an earlier stage than the coring processing in the Y signal processing system. Consequently, a substantially constant amount of coring threshold level is set irrespective of the image brightness. Substantially all the noise components are removed and the shortage of the image resolution is easily solved in the low-luminance area.

The output signal from the image pick-up device (CCD 10) is explained as the color image signals (RGB) in the original color system according to the embodiment. However, the present invention is not limited to this and it is easily applied to the case of using the image pick-up device for outputting the color image signal of a complementary color system.

As mentioned above, the present invention provides the image signal processing system capable of generating the preferable image data by devising various signal processing executed based on the image signal obtained by the image pick-up device and the camera using the image signal processing system.

Another embodiment in which the above embodiment is partly combined belongs to the present invention.

In this invention, it is apparent that working modes different in a wide range can be formed on this basis of this invention without departing from the sprit and scope of the invention. This invention is not restricted by any specific embodiment except being limited by the appended claims.

What is claimed is:

1. A camera comprising:
   a first signal processing system including
   1) a first gamma conversion processor adapted to subject an output from an image pick-up device to gamma conversion processing,
   2) a luminance signal generator adapted to generate a first luminance signal based on the output from the first gamma conversion processor,
   3) an edge signal generator adapted to generate an edge signal based on the first luminance signal generated by the luminance signal generator,
   4) a coring processor adapted to suppress a small output signal of a predetermined level with respect to the edge signal generated by the edge signal generator, and
   5) a final luminance signal generator adapted to generate a final luminance signal by adding (A) the first luminance signal generated by the luminance signal generator and (B) an output signal of the coring processor; and
   a second signal processing system configured by a processing system different from the first signal processing, the second signal processing system including
   1) color correction processing unit for performing color correction processing based on an output which is the output from the image pick-up device and which is not subjected to the gamma conversion processing,
   2) second gamma conversion processing unit for performing gamma conversion processing, coming after the color correction processing unit, and
   3) chroma signal generating unit for generating a chroma signal, coming after the second gamma conversion processing unit.

2. The camera according to claim 1, wherein the second signal processing system further includes a band limiter which is independent of the first signal processing system.

3. The camera according to claim 1, wherein the first signal processing system and the second signal processing system are digital systems.

4. An image signal processing system comprising:
   an input terminal portion which is arranged to receive an output signal from an image pick-up device having a predetermined-type color filter on the side of an image pick-up surface or to receive a color image pick-up signal substantially equivalent to the output from the image pick-up device;
   a first signal processing system including
   1) a first gamma conversion processor adapted to process gamma conversion on the signal supplied from the input terminal portion,
   2) a luminance signal generator adapted to generate a first luminance signal based on an output from the first gamma conversion processor,
   3) an edge signal generator adapted to generate an edge signal based on the first luminance signal generated by the luminance signal generator, and
   4) a coring processor adapted to suppress a small output signal of a predetermined level with respect to the edge signal generated by the edge signal generator, and
   5) a final luminance signal generator adapted to generate a final luminance signal by adding (A) the first luminance signal generated by the luminance signal generator and (B) an output signal of the coring processor; and
   a second signal processing system configured by a processing system different from the first signal processing system, the second signal processing system including
   1) color correction processing unit for performing color correction processing based on an output which is the output from the image pick-up device and which is not subjected to the gamma conversion processing, 2) second gamma conversion processing unit for performing gamma conversion processing, coming after the color correction processing unit, and 3) chroma signal generating unit for generating a chroma signal, coming after the second gamma conversion processing unit.

5. The image signal processing system according to claim 4, wherein the edge signal generator includes an edge signal extracting unit for extracting an edge signal from the first luminance signal generated by the luminance signal generator and an edge emphasis processor.

6. The image signal processing system according to claim 4, wherein the second signal processing system further includes a band limiter independently of the first signal processing system.

7. The image signal processing system according to claim 4, wherein the first signal processing system and the second signal processing system are digital systems.

8. A camera comprising:

a first signal processing system including 1) a first gamma conversion processor adapted to subject an output from an image pick-up device to gamma conversion processing, 2) a luminance signal generator adapted to generate a first luminance signal based on the output from the first gamma conversion processor, 3) a high-band luminance signal generating system adapted to generate a high-band luminance signal based on the first luminance signal generated by the luminance signal generator, and 4) a final luminance signal generator adapted to generate a final luminance signal by adding (A) the high-band luminance signal generated by the high-band luminance signal generating system and (B) the first luminance signal generated by the luminance signal generator; and a second signal processing system configured by a processing system different from the first signal processing, the second signal processing system including 1) color correction processing unit for performing color correction processing based on an output which is the output from the image pick-up device and which is not subjected to the gamma conversion processing, 2) second gamma conversion processing unit for performing gamma conversion processing, coming after the color correction processing unit, and 3) chroma signal generating unit for generating a chroma signal, coming after the second gamma conversion processing unit.

9. The camera according to claim 8, wherein the second signal processing system further includes a band limiter independently of the first signal processing system.

10. The camera according to claim 8, wherein the first signal processing system and the second signal processing system are digital systems.

* * * * *